US008351488B2

(12) United States Patent
Dawid et al.

(10) Patent No.: US 8,351,488 B2
(45) Date of Patent: Jan. 8, 2013

(54) DIVERSITY RECEIVER

(75) Inventors: Herbert Dawid, Aachen (DE); Juergen Niederholz, Geldern (DE); Christian Drewes, Germering (DE); Thorsten Clevorn, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 1158 days.

(21) Appl. No.: 12/052,527

(22) Filed: Mar. 20, 2008

(65) Prior Publication Data

US 2009/0238246 A1 Sep. 24, 2009

(51) Int. Cl.
*H04B 1/00* (2006.01)

(52) U.S. Cl. .......................................................... 375/148

(58) Field of Classification Search .................. 375/148
See application file for complete search history.

(56) References Cited

U.S. PATENT DOCUMENTS 6,304,750 B1 * 10/2001 Rashid-Farrokhi et al. .. 455/137
2005/0025225 A1 * 2/2005 Niederholz et al. .......... 375/148
2005/0069023 A1 * 3/2005 Bottomley et al. ........... 375/148
2005/0271123 A1 * 12/2005 Fulghum ....................... 375/148
2007/0177658 A1 * 8/2007 Mehrabani et al. ........... 375/148
2008/0232438 A1 * 9/2008 Dai et al. ...................... 375/148

FOREIGN PATENT DOCUMENTS

DE 10 2004 017 488 B4 11/2005
DE 10 2005 019 176 A1 11/2006

* cited by examiner

*Primary Examiner* — Leon-Viet Nguyen

(74) *Attorney, Agent, or Firm* — Eschweiler & Associates, LLC

(57) ABSTRACT

A receiver, includes a plurality of antennas to receive radio signals from a plurality of transmission paths, and a plurality of sets of RAKE fingers to generate first signals. Each set of RAKE fingers is coupled to a respective one of the plurality of antennas, and a weighting factor generator generates weighting factors for weighting the first signals, wherein the weighting factor for one of the first signals is generated by using first signals generated by at least two of the plurality of sets of RAKE fingers. Further, at least two of the first signals used to generate the weighting factor are received from the same transmission path.

37 Claims, 11 Drawing Sheets

Rx Antenna 4.1
Sum of Scrambled OVSF Codes (34800 chips)
10.1
10.2
10.3
$h_{1,1}$
$h_{1,2}$
$h_{1,3}$
$\tau_1$
$\tau_2$ Rx Antenna 4.2
Sum of Scrambled OVSF Codes (34800 chips)
$h_{2,1}$
$h_{2,2}$
$h_{2,3}$
$\tau_1$
$\tau_2$ 900
4.1
4.2
15.1-15.N
16.1-16.N
17.1-17.N
CPICH
Despreader
DPCH
Despreader
22.1-22.N
18.1-18.N
CPICH
Channel
Estimation
$h_{1,1}'-h_{1,N}'$
19.1-19.N
$Z^{-1}$
$h_{1,1}-h_{1,N}$
20.1-20.N
Calc
$R_E, R_Y$
Filter
21.1-21.N
Comb
5
Data 1200
4.1
4.2
15.1-15.N
16.1-16.N
17.1-17.N
CPICH Despreader
18.1-18.N
CPICH Channel Estimation
19.1-19.N
$Z^{-1}$
DPCH Despreader
22.1-22.N
Estimation
23.1-23.N
$Z^{-1}$
19.1'-19.N'
Filter
21.1-21.N
Comb
5

1400
Receiving radio signals by a plurality of antennas
Step 1
Generating first signals by a plurality of sets of RAKE fingers
Step 2
Generating weighting factors for weighting the first signals
Step 3

DIVERSITY RECEIVER

FIELD OF THE INVENTION

This invention relates to receivers in general and more particularly to diversity receivers.

BACKGROUND OF THE INVENTION

In radio frequency communications systems signals that are transmitted between a transmitter and a receiver may be deteriorated or lost due to multi-path fading or shadowing. The signals propagate from the transmitter to the individual antennas via different transmission channels. Interference and noise may occur during signal transmission, propagation through those different transmission channels, and reception. Sources of interference are, for example:

Adjacent channel interference (ACI): Signals on adjacent carrier frequencies may leak into the receive signal band.

Co-channel interference (CCI) or inter-cell interference: Signals different from the useful signal, sent by other remote base stations transmitting on the same carrier frequency, may interfere with the useful signal.

Multi-path interference or intra-cell interference: As the useful signal may be propagating through different physical paths, copies of the useful signal may be received arriving with different delays at the receiver due to the different lengths of the different transmission paths.

BRIEF DESCRIPTION OF THE DRAWINGS

Aspects of the invention are made more evident by way of example in the following detailed description of embodiments when read in conjunction with the attached drawing figures.

DETAILED DESCRIPTION OF THE INVENTION

Figure 1:
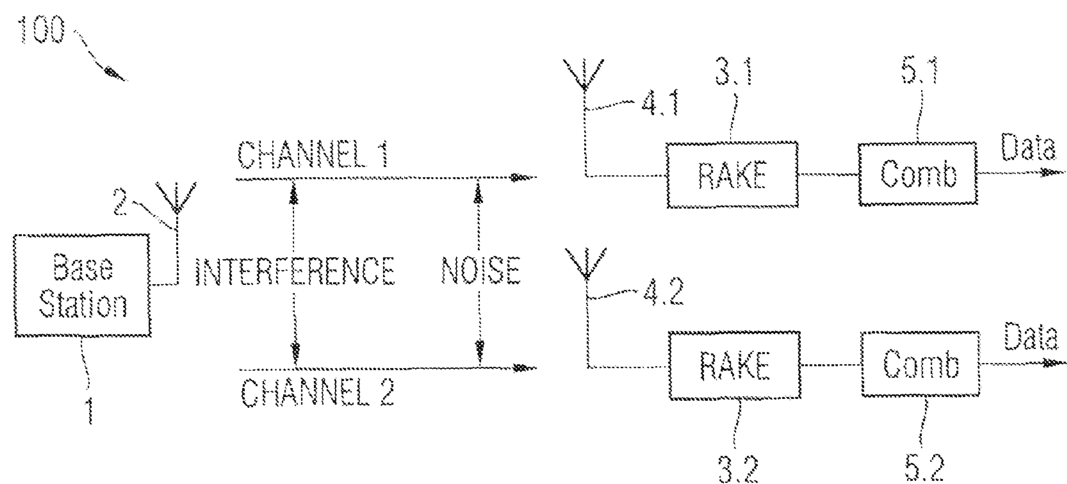
FIG. 1 schematically illustrates a radio frequency communications system 100.

In the following one or more aspects and/or embodiments of the invention are described with reference to the drawings, wherein like reference numerals are generally utilized to refer to like elements throughout. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in block diagram form in order to facilitate describing one or more aspects of the embodiments of the invention. The following description is not to be taken in a limiting sense, and the scope of the invention is defined by the appended claims.

In addition, while a particular feature or aspect of an embodiment may be disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless of whether they are in direct physical or electrical contact, or are not in direct contact with each other. Also, the term "exemplary" is merely meant as an example, rather than the best or optimal.

FIG. 1 schematically illustrates a radio frequency communications system 100. The communications system 100 includes a base station 1 with an antenna 2, RAKE receivers 3.1, 3.2, antennas 4.1, 4.2 and combining units 5.1 and 5.2. During operation of the communications system 100, the base station 1 transmits radio frequency signals using its antenna 2. It is understood that the base station 1 may utilize a plurality of antennas and need not be restricted to a single antenna 2. The radio frequency signals are transmitted over the air interface and propagate from the antenna 2 to the antennas 4.1 and 4.2 via different transmission channels (cf. "CHANNEL 1", "CHANNEL 2"). It is to be noted that the communications system 100 need not be restricted to only two transmission channels, but may be based on an arbitrary number of transmission channels. Interference and noise occurring between the different transmission channels (cf. "INTERFERENCE", "NOISE") may lead to a degraded link quality.

The radio signals transmitted over the first transmission channel are received at the antenna 4.1 and processed in the RAKE receiver 3.1. In a similar way, the radio signals transmitted over the second transmission channel are received at the antenna 4.2 and processed in the RAKE receiver 3.2. A more detailed and exemplary description of the internal structure of a RAKE receiver will be provided in FIG. 2 and its related description. The RAKE receivers 3.1 and 3.2 usually output a plurality of signals which are combined by the combining units 5.1 and 5.2, respectively. It is understood that the combining units 5.1 and 5.2 may be combined to one single combining unit configured to combine the signals of both RAKE receivers 3.1 and 3.2. Each of the combining units 5.1 and 5.2 outputs a data stream which may be further processed, for example by a digital signal processor (not shown).

The units 3.1, 3.2, 4.1, 4.2, 5.1 and 5.2 form a diversity receiver having at least two antennas 4.1 and 4.2. Since the signals transmitted by the antenna 2 propagate via different transmission channels and since each of the transmission channels experiences different multi-path fading and shadowing, the use of multiple antennas and a combination of the received and processed signals leads to an improved link quality.

In one of many ways, diversity receivers receive signals which are so-called multi-carrier signals. Multi-carrier signals are produced by splitting a signal to be transmitted into a plurality of sub-signals, each of which is transmitted separately on an individual frequency carrier. A receiver receives the sub-signals from each of the carriers and recombines them to reproduce the original signal. In multi-carrier transmission systems, diversity receivers take advantage of the fact that the multi-path fading and shadowing on the different antennas is not identical such that, when one antenna receives a multi-carrier signal comprising faded sub-signals, chances are that another antenna receives these sub-signals without fading. Combining the multi-carrier signals received by the individual antennas can thus mitigate fading.

The diversity receiver 100 may reduce the required transmit power for signal transmission between the transmitter and the receiver. Usually the receiver performance is limited by multipath and inter-cell interference, i.e. even for the case of zero noise, the bit and block error rates run into a limiting error floor. In order to provide a certain link quality, the received energy per transmitted bit needs to be constant. For example, high data rate links or terminals located at unfavorable places like cell edges require a large amount of the cell's power budget and therefore cut down capacity. By using a diversity receiver, the required transmit power may be reduced and a decrease of capacity may be avoided. However, performance is still interference limited, wherein interference sources are multipath and inter-cell interference. The interference terms are correlated spatially, i.e. between two different transmission channels.

Figure 2:
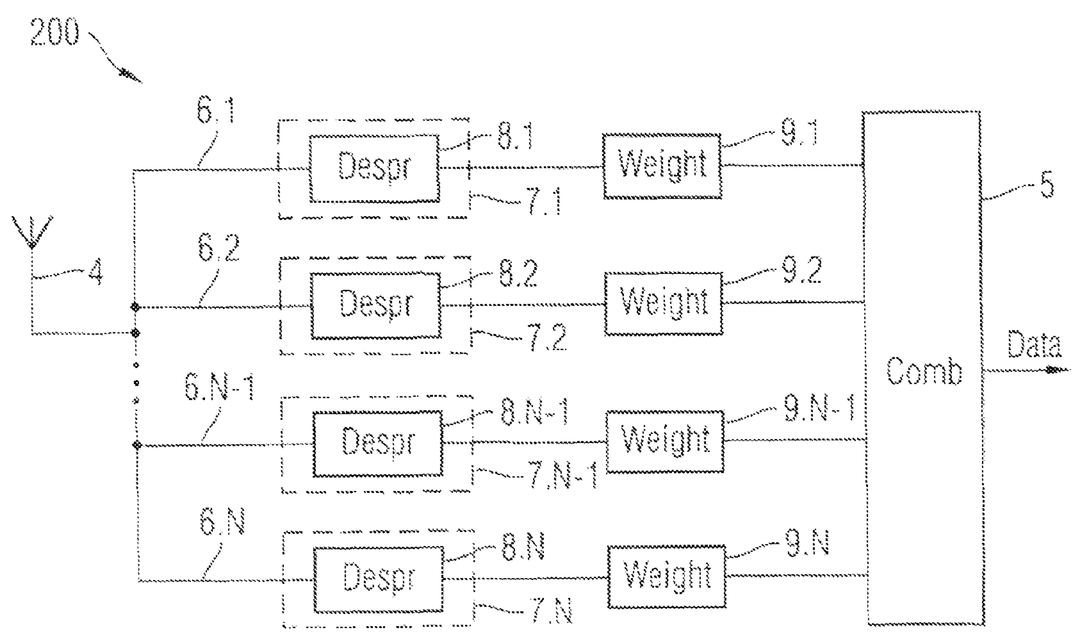
FIG. 2 schematically illustrates a RAKE receiver 200.

FIG. 2 schematically illustrates a RAKE receiver 200. The RAKE receiver 200 includes an antenna 4 and N signal paths 6.1 to 6.N. Each of the signal paths 6.1 to 6.N includes a RAKE finger 7.1 to 7.N which in turn may include despreaders 8.1 to 8.N. The signal paths 6.1 to 6.N further contain weighting units 9.1 to 9.N connected to a combining unit 5.

Beside the components illustrated in FIG. 2, the RAKE receiver 200 may include further components which are not explicitly illustrated for the sake of simplicity. The antenna 4 receives radio signals which are processed in the N signal paths 6.1 to 6.N. Usually the antenna 4 receives analog signals in a radio frequency range which are first down-converted into an intermediate frequency band or into the baseband by a down-conversion unit (not shown). After down-conversion, the analog signal is usually converted to a digital signal by means of an ADC (Analog-to-Digital Converter) (not shown) to provide digital samples. The digital samples may include in-phase (I) and quadrature (Q) components that are divided into digital streams of I and Q samples. Moreover, the RAKE receiver 200 may further contain amplifiers, analog filters, digital filters, etc.

Due to the multiple propagation paths, the antenna 4 receives multiple images (or versions) of the transmitted signal with each signal image generally suffering from a different path delay, phase and attenuation effects. In the RAKE receiver 200, each of the signal paths 6.1 to 6.N and each of the RAKE fingers 7.1 to 7.N is allocated to a particular one of the multipath propagation paths of the signal received at the antenna 4. That is, each of the RAKE fingers 7.1 to 7.N receives its own image (or version) of the originally transmitted signal. Each of the RAKE fingers 7.1 to 7.N can be time-aligned to process its input signal at an assigned path delay. For this purpose, each of the signal paths 6.1 to 6.N may contain delay elements (not shown) to delay the digital signals corresponding to the respective delays between the multiple propagation paths.

The signals received at the antenna 4 may be spread by means of a spreading code used in conventional CDMA (Code Division Multiple Access) communications systems. Each of the spread multipath signals is despread in the RAKE fingers 7.1 to 7.N using the despreaders (or correlators) 8.1 to 8.N. It is understood that the RAKE fingers 7.1 to 7.N may include further components. For example, in case of a DSSS (Direct Sequence Spread Spectrum)-CDMA communication, the RAKE fingers 7.1 to 7.N may include a plurality of despreaders each operating on a different DSSS data signal. The despreaders 8.1 to 8.N correlate the spread signals with a chip sequence to obtain corresponding despread signals. The chip sequence may be generated by a chip sequence generator (not shown). If the received signals are not spread by a spreading code, the despreaders 8.1 to 8.N may be omitted. However, for the sake of simplicity, it is assumed that the RAKE receiver 200 includes the despreaders 8.1 to 8.N.

After despreading, the despread signals processed in the signal paths 6.1 to 6.N are weighted by weighting units 9.1 to 9.N. The weighting factors used for this purpose merely depend on the despread signal of the respective signal path. The weighted signals are then combined by the combining unit 5. For example, the combining unit 5 may be based on the maximum ratio combining technique in order to obtain a combined signal with a maximum signal-to-noise ratio and a minimized bit error rate.

The RAKE receiver 200 of FIG. 2 may be incorporated into the communications system 100 of FIG. 1. Regarding FIGS. 1 and 2, it can be seen that signals received at the antennas 4.1 and 4.2 are processed independently from each other. That is, the diversity receiver architecture as shown in FIG. 1 does not consider existing correlations between signals received at two different antennas 4.1 and 4.2. In particular, the weights used for weighting a despread signal in a path merely depend on the signals assigned to the respective path.

Figure 3A:
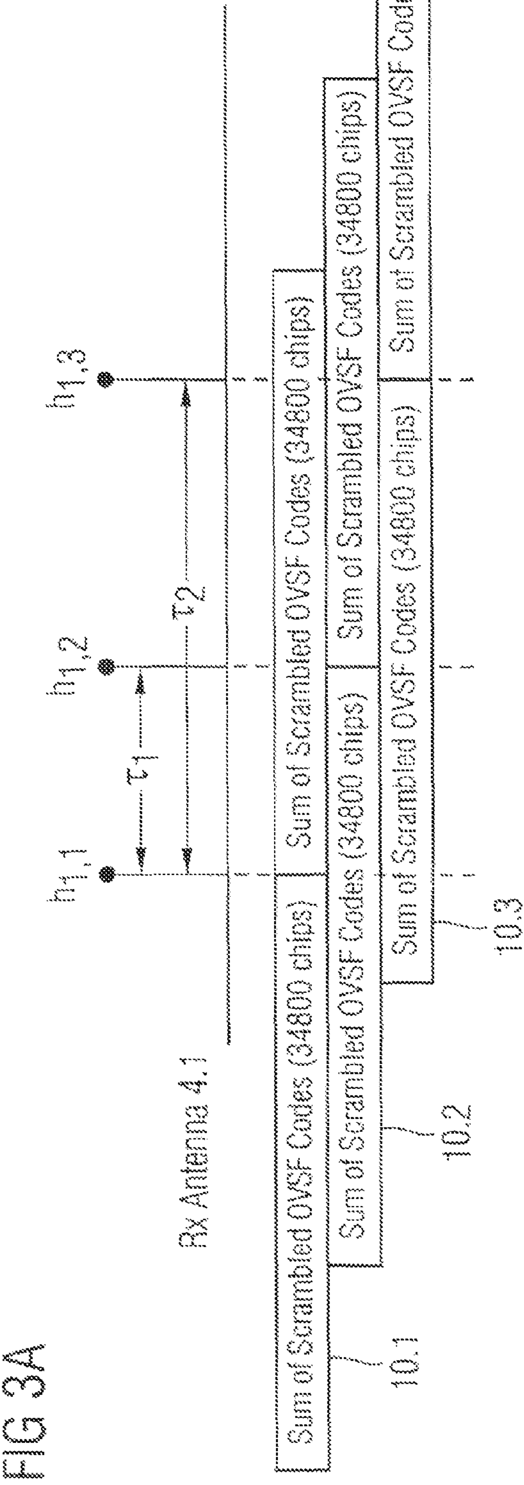
FIG. 3*a* schematically illustrates a structure of a signal.

FIG. 3*a* schematically illustrates the structure of a radio signal as it may be received by the antenna 4.1. The illustrated signal may be based on the OVSF (Orthogonal Variable Spreading Factor) technique as it may be used for the CDMA downlink. The sequences 10.1, 10.2 and 10.3 show signals received over different transmission paths at the first antenna 4.1. In particular, the sequence 10.1 corresponds to a first transmission path, the sequence 10.2 corresponds to a second transmission path, and the sequence 10.3 corresponds to a third transmission path. Each of the sequences 10.1, 10.2 and 10.3 contains various frames, with each frame consisting of 34800 chips. As already explained above, due to multiple transmission paths of the received signal, the antenna 4.1 receives multiple images (or versions) of the transmitted signal, with each signal image generally suffering from a different path delay, phase and attenuation effects. Accordingly, the sequences 10.1, 10.2 and 10.3 are delayed with respect to one another.

The time delay between the sequence 10.1 and the sequence 10.2 is indicated by $\tau_1$, whereas the time delay between the sequence 10.1 and the sequence 10.3 is indicated by $\tau_2$. Each of the sequences 10.1, 10.2 and 10.3 is associated with a channel weight $h_{i,j}$ which may be estimated by means of channel estimation. Here, the index i refers to the respective antenna and the index j refers to the respective transmission path (i.e. the respective RAKE finger). For example, the channel weight $h_{1,2}$ refers to the signal received at the first antenna 4.1 via the second transmission path.

Figure 3B:
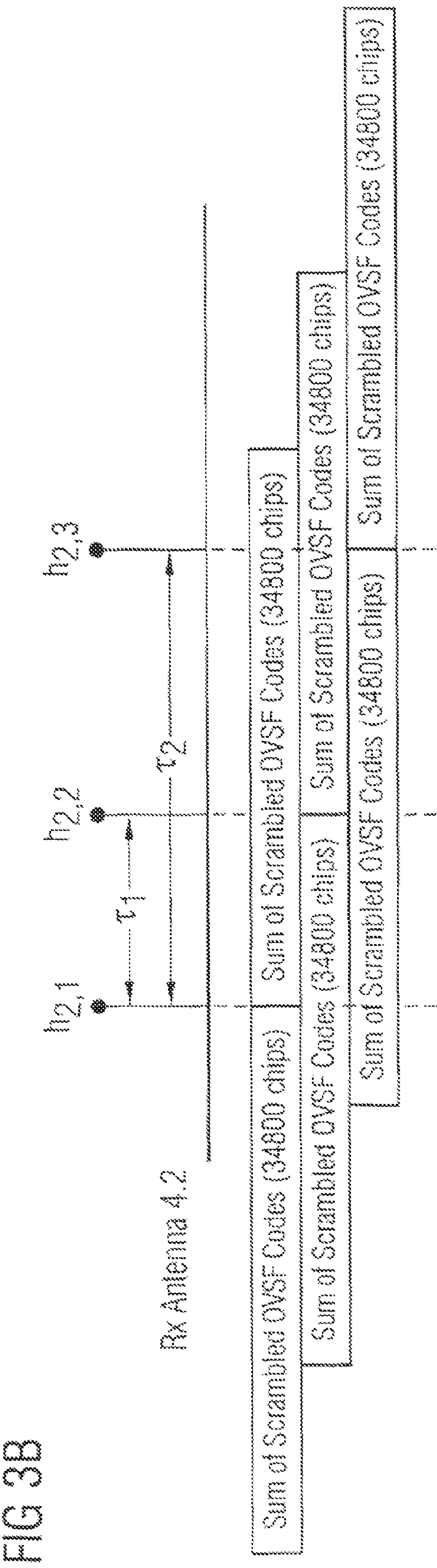
FIG. 3*b* schematically illustrates a structure of a further signal.

FIG. 3*b* schematically illustrates the structure of another radio signal as it may be received by the antenna 4.2. The signals of FIGS. 3*a* and 3*b* show the same structure. Accordingly, the given comments on the signal of FIG. 3*a* also hold true for the signal of FIG. 3*b*. However, the channel weights of the two signals differ due to the different positions of the antennas 4.1 and 4.2. There may occur correlation between the received signals of the antennas 4.1 and 4.2 which may include scrambling code auto-correlations (noise-like inter-path interference) and scrambling code cross-correlations (noise-like inter-cell interference). As will be seen later, the correlation between the signals received at the antennas 4.1 and 4.2 may be exploited for interference whitening and interference cancellation.

Figure 4:
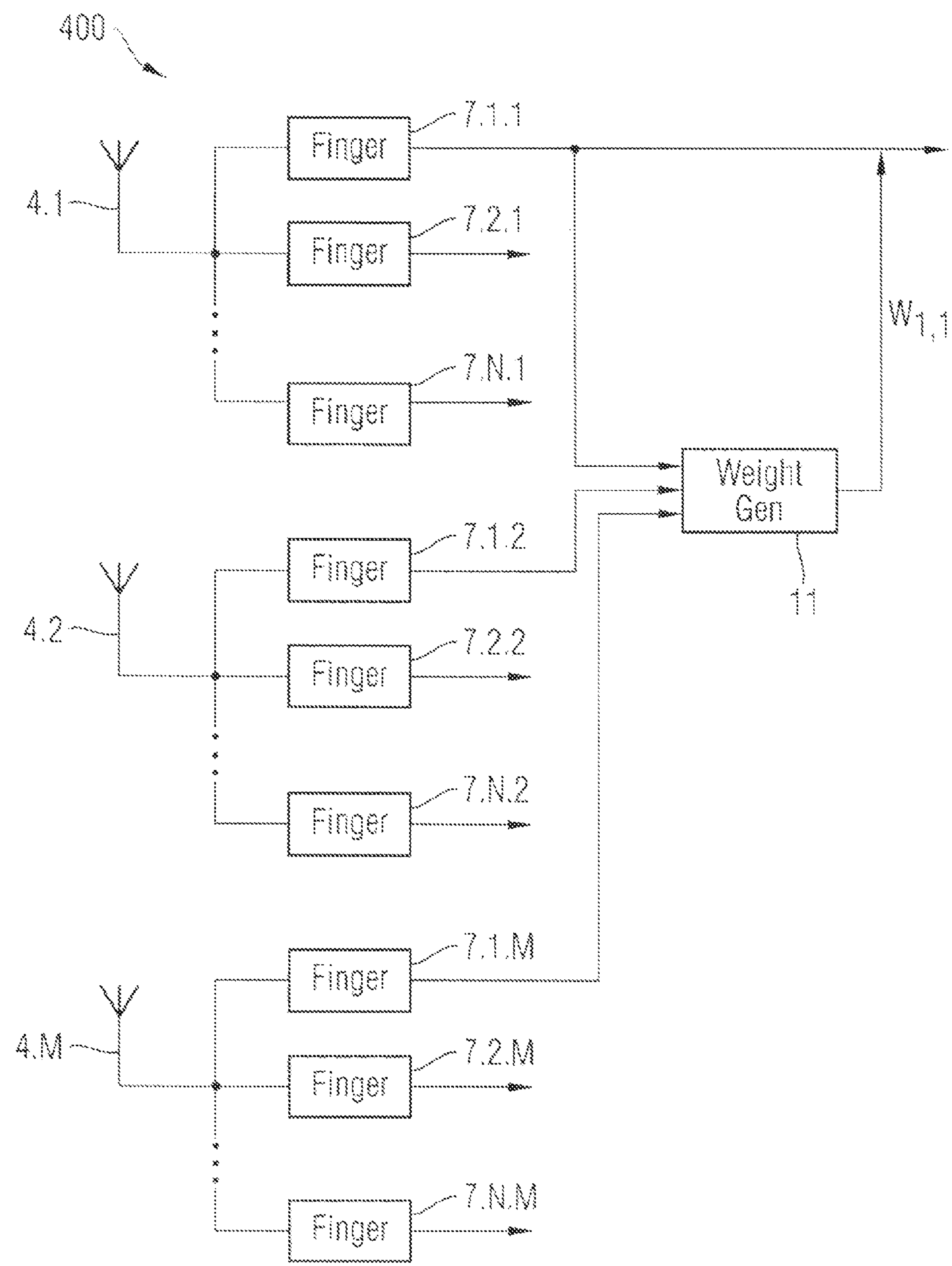
FIG. 4 schematically illustrates a receiver 400 as an exemplary embodiment.

FIG. 4 schematically illustrates a receiver 400 as an exemplary embodiment. The receiver 400 includes M antennas 4.1 to 4.M to receive radio signals as well as a plurality of sets of RAKE fingers 7.1.1 to 7.N.M. The RAKE fingers 7.1.1 to 7.N.M are configured to generate first signals, with each set of RAKE fingers being coupled to a respective one of the plurality of antennas. For example, the set of RAKE fingers 7.1.1 to 7.N.1 is coupled to the antenna 4.1. Accordingly, the set of RAKE fingers 7.1.1 to 7.N.1 processes radio signals received at the antenna 4.1 via multiple propagation paths.

The receiver 400 further includes a weighting factor generator 11 to generate weighting factors for weighting the first signals. The internal structure of the weighting factor generator 11 is not explicitly illustrated in FIG. 4. The weighting factor generator 11 may be implemented in various ways. One specific implementation according to one embodiment will be discussed later. For example, the outputs of the RAKE fingers 7.1.1, 7.1.2 and 7.1.M are fed into the weighting factor generator 11. The weighting factor generator 11 calculates and outputs a weighting factor $w_{1,1}$ to weight the signal received at the antenna 4.1 and processed by the RAKE finger 7.1.1. It is understood that the weighting factor may also be generated using the output of other RAKE fingers. The RAKE fingers 7.1.1, 7.1.2 and 7.1.M may be assigned to the same transmission path over which the radio signals were transmitted from the transmitting station to the receiver 400. It is understood that although the signals processed by the RAKE fingers 7.1.1, 7.1.2 and 7.1.M are transmitted over the same transmission path, this transmission path may be microscopically different for the respective antennas 4.1, 4.2 and 4.M due to the distances of the antennas 4.1, 4.2 and 4.M between each other.

It can be seen from FIG. 4 that the generated weighting factor $w_{1,1}$ depends on first signals generated by at least two of the plurality of sets of RAKE fingers. That is, the generation of the weighting factor $w_{1,1}$ depends on first signals coming from more than one antenna. In contrast to this, each of the weighting factors as they are employed by the weighting units 9.1 to 9.N of FIG. 2 merely depends on signals coming from only one antenna. Since the weighting factor unit 11 takes into account signals coming from more than one antenna, correlation between received signals of the two antennas 4.1 and 4.2 may be exploited for interference cancellation.

Figure 5:
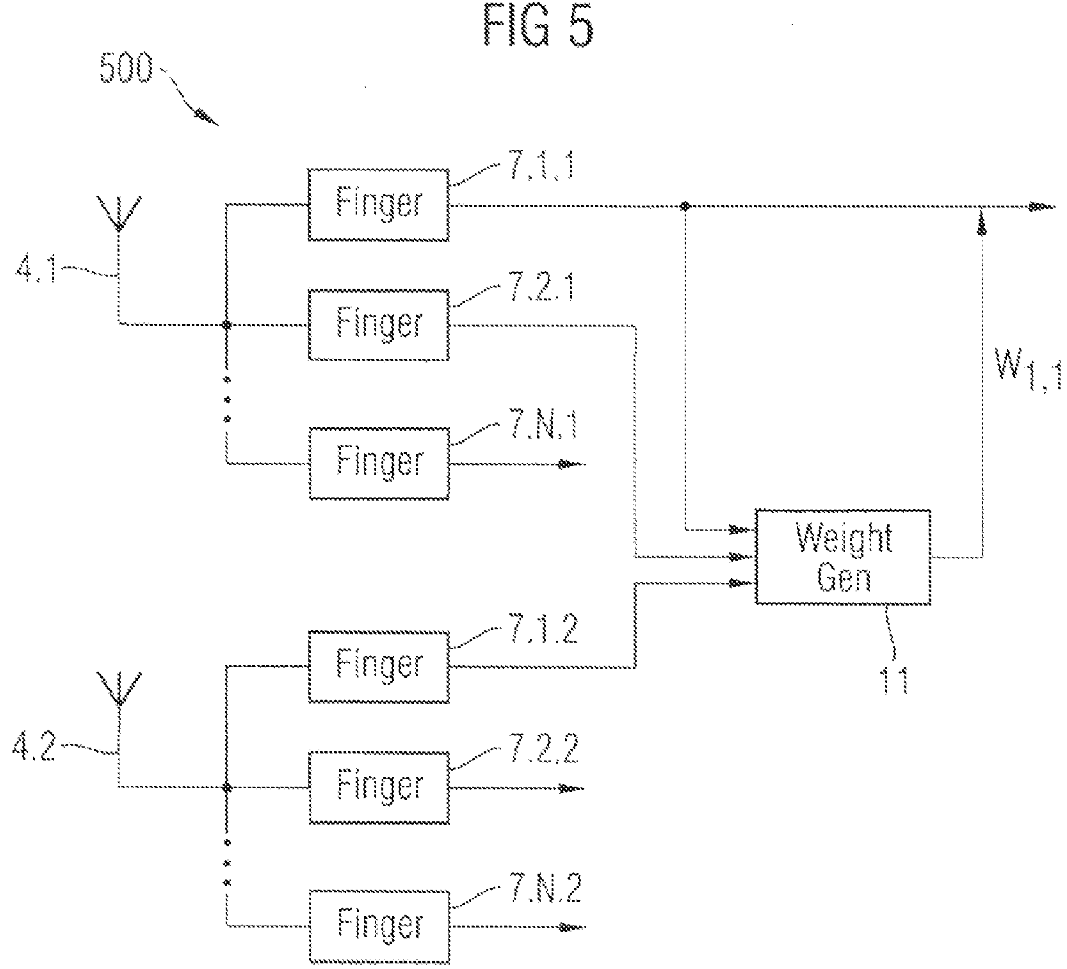
FIG. 5 schematically illustrates a receiver 500 as a further exemplary embodiment.

FIG. 5 schematically illustrates a receiver 500 as a further exemplary embodiment. The receiver 500 includes two antennas 4.1 and 4.2 to receive radio signals transmitted over multiple propagation paths. The receiver 500 further includes a plurality of first RAKE fingers 7.1.1 to 7.N.1 coupled to the first antenna 4.1 and configured to generate first signals. In a similar way, a plurality of second RAKE fingers 7.1.2 to 7.N.2 is coupled to the second antenna 4.2 and is configured to generate second signals. The receiver 500 further includes a weighting factor generator 11 to generate a first weighting factor for weighting one of the first signals.

In FIG. 5, signals output from the RAKE fingers 7.1.1, 7.2.1 and 7.1.2 are input to the weighting factor generator 11. The weighing factor generator 11 outputs a weighting factor (for example $w_{1,1}$) for weighting the signal generated by the RAKE finger 7.1.1. In general, the weighting factor is generated using at least one of the first signals and one of the second signals. It is understood that the weighting factor may also be generated in various other ways, as long as the generation of the weighting factor depends on signals coming from different antennas 4.1 and 4.2.

From FIG. 5 it becomes clear that the generation of the weighting factor depends on signals coming from more than one antenna. In contrast to this, each of the weighting factors employed by the weighting units 9.1 to 9.N of FIG. 2 merely depends on signals coming from only one antenna. Since the weighting factor unit 11 takes into account signals coming from more than one antenna, correlation between received signals of the two antennas 4.1 and 4.2 may be exploited for interference whitening and interference cancellation.

Figure 6:
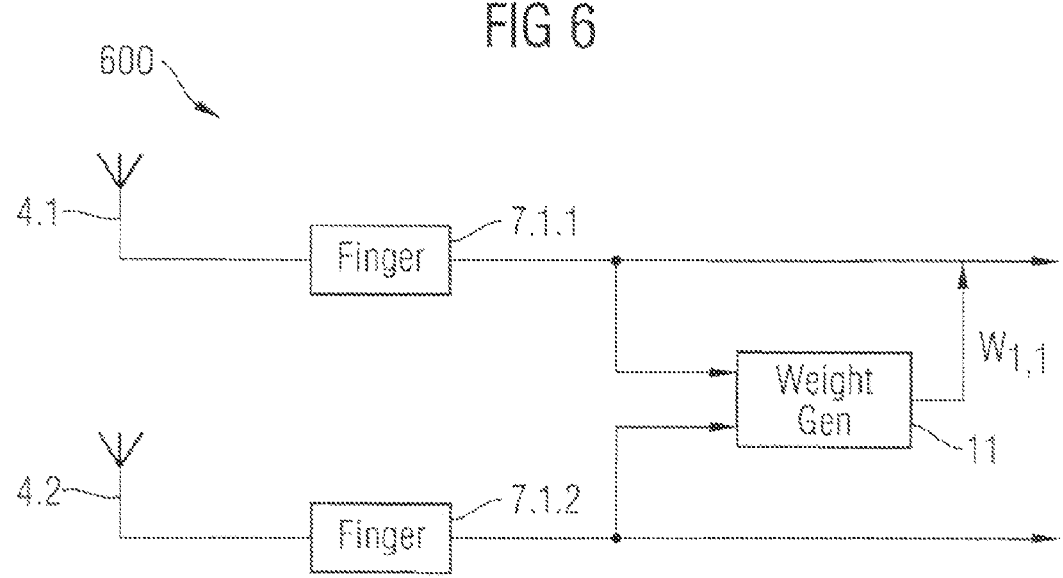
FIG. 6 schematically illustrates a receiver 600 as a further exemplary embodiment.

FIG. 6 schematically illustrates a receiver 600 as a further exemplary embodiment. The receiver 600 includes a first antenna 4.1 and a second antenna 4.2 to receive radio signals. A first RAKE finger 7.1.1 is coupled to the first antenna 4.1 and generates a first signal. In a similar way, a second RAKE finger 7.1.2 is coupled to the second antenna 4.2 and generates a second signal. The RAKE fingers 7.1.1 and 7.1.2 are assigned to the same transmission path. The receiver 600 further includes a weighting factor generator 11 to generate a weighting factor $w_{1,1}$ for weighting the signal output by the RAKE finger 7.1.1. Here, the first weighting factor $w_{1,1}$ is generated using the signals of both RAKE fingers 7.1.1 and 7.1.2. The generated weighting factor $w_{1,1}$ is then output by the weighting factor generator 11 and used to weight the signal generated by the RAKE finger 7.1.1.

It can be seen from FIG. 6 that the generated weighting factor $w_{1,1}$ depends on signals coming from more than one antenna. In contrast to this, each of the weighting factors employed by the weighting units 9.1 to 9.N of FIG. 2 merely depends on signals coming from only one antenna. Since the weighting factor unit 11 takes into account signals coming from more than one antenna, correlation between received signals of the two antennas 4.1 and 4.2 may be exploited for interference whitening and interference cancellation.

Figure 7:
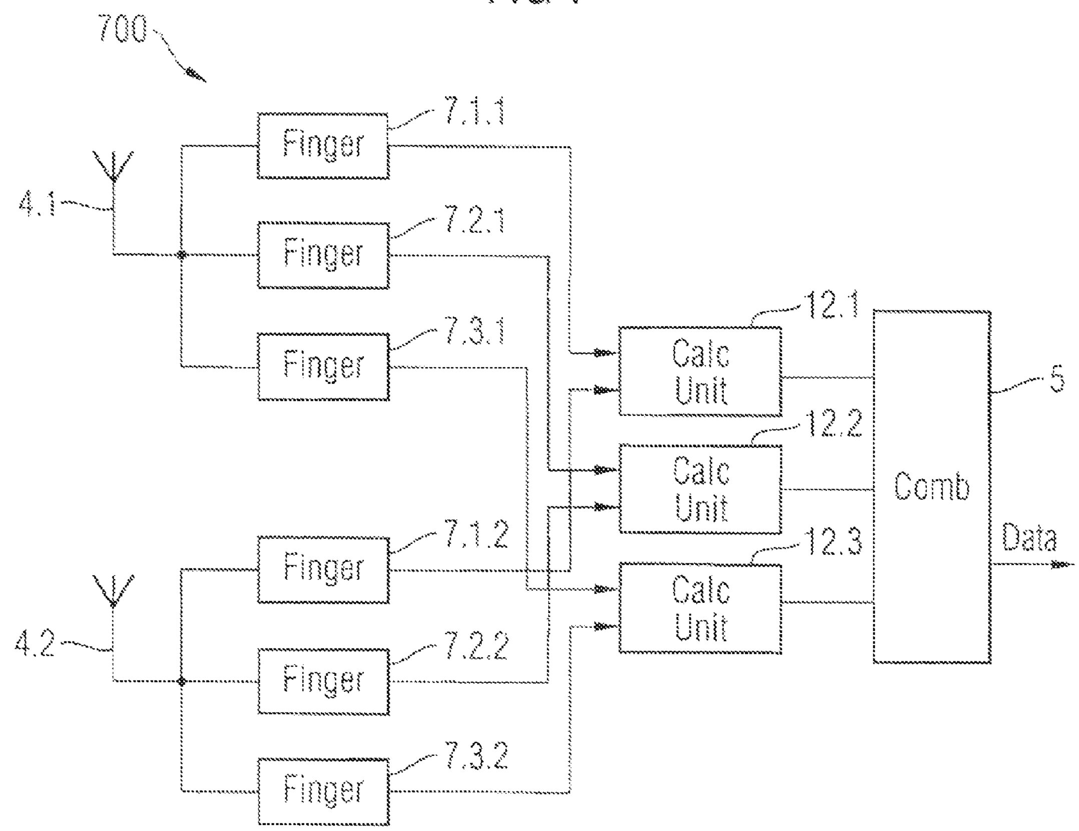
FIG. 7 schematically illustrates a receiver 700 as a further exemplary embodiment.

FIG. 7 schematically illustrates a receiver 700 as a further exemplary embodiment. The receiver 700 includes two antennas 4.1 and 4.2 to receive radio signals. The first antenna 4.1 is coupled to a first plurality of RAKE fingers 7.1.1, 7.2.1 and 7.3.1, with each of the RAKE fingers being assigned to a specific transmission path of the signal received at the antenna 4.1. In a similar way, the antenna 4.2 is coupled to a second plurality of RAKE fingers 7.1.2, 7.2.2 and 7.3.2. It is understood that the receiver 700 may be generalized to an arbitrary number of antennas and an arbitrary number of RAKE fingers. However, for the sake of simplicity, only two antennas and only three RAKE fingers per antenna are illustrated in FIG. 7.

The outputs of the RAKE fingers 7.1.1 and 7.1.2 are coupled to the inputs of a calculation unit 12.1, the internal structure of which will be described in connection with FIG. 8 according to one embodiment. In a similar way, the outputs of the RAKE fingers 7.2.1 and 7.2.2 are coupled to the inputs of a calculation unit 12.2, and the outputs of the RAKE fingers 7.3.1 and 7.3.2 are coupled to the inputs of a calculation unit 12.3. The calculation units 12.2 and 12.3 are similar to the calculation unit 12.1. The outputs of the calculation units 12.1, 12.2 and 12.3 are coupled to a combining unit 5 which outputs data that may be further processed, for example by a digital signal processor (not shown).

Radio signals are received at the antenna 4.1 and processed (for example despread) in the RAKE fingers 7.1.1, 7.2.1 and 7.3.1. A similar despreading has already been described in connection with FIG. 2. In a next step, two despread signals at a time are fed into the calculation units 12.1, 12.2 and 12.3, respectively. The further processing of the signals will be described in connection with FIG. 8.

Figure 8:
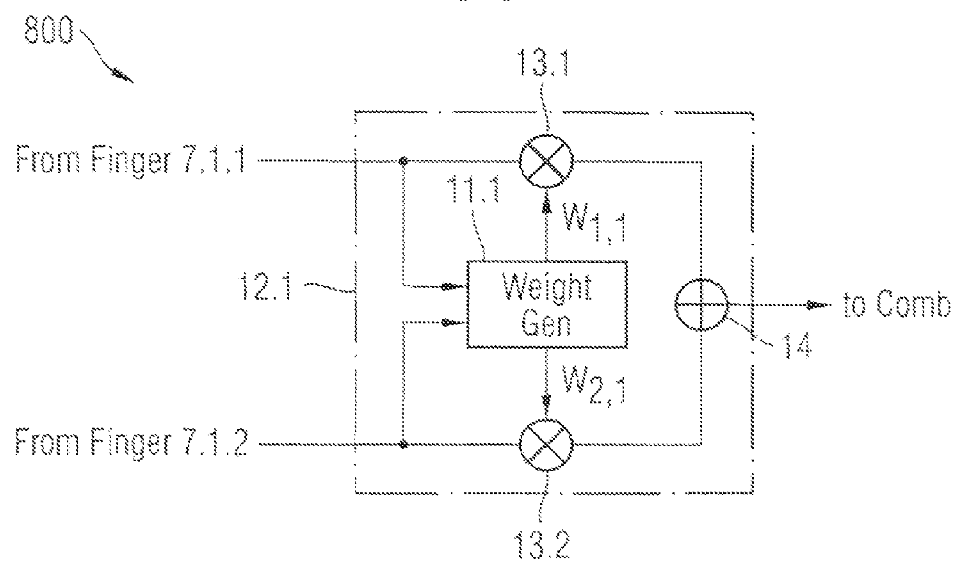
FIG. 8 schematically illustrates a detailed section 800 of the receiver 700.

FIG. 8 schematically illustrates a detailed section 800 of the receiver 700 according to one embodiment. The section 800 corresponds to the calculation unit 12.1 of FIG. 7 and therefore shows the same reference sign. The calculation unit 12.1 has two inputs connected to inputs of a weighting factor generator 11.1. Moreover, each of these inputs of the calculation unit 12.1 is connected to multipliers 13.1 and 13.2. The weighting factor generator 11.1 has two outputs which are coupled to the multipliers 13.1 and 13.2, respectively. The outputs of the multipliers 13.1 and 13.2 are coupled to an adder 14. The adder 14 generates second signals which are forwarded to the combining unit 5 of FIG. 7.

During operation, the weighting factor generator 11.1 generates the weighting factors $w_{1,1}$ and $w_{2,1}$ used to weight the signals generated by the RAKE fingers 7.1.1 and 7.1.2. The generation of the weighting factors may, for example, depend on channel weights estimated by a channel estimation unit which may also be included in the receiver 700. The weighting corresponds to a multiplication performed by the multipliers 13.1 and 13.2. The weighted signals are added by the adder 14 and output by the calculation unit 12.1. A mathematical scheme for generating the weighting factors $w_{1,1}$ and $w_{2,1}$ according to one embodiment will be described in the following paragraphs.

Referring again to FIG. 7, the second signals output from the calculation units 12.1, 12.2 and 12.3 are combined by the combining unit 5. For example, the combining unit 5 may be based on the maximum-ratio-combining technique in one embodiment to obtain a combined signal with the maximum signal-to-noise ratio and a minimized bit error rate. The combining unit 5 generates third signals. As an alternative to the embodiment shown in FIGS. 7 and 8, the first signals generated by the RAKE fingers may be weighted with their respective weighting factors and may be then fed into the combining unit 5 without adding them by the adder 14. The summing operation may be carried out in the combining unit 5 in the course of the maximum-ratio-combining. As a further alternative embodiment, it may be provided that the combining unit 5 is arranged up-stream of the calculation units 12.1, 12.2 and 12.3 in the signal processing path. Furthermore, the calculation units 12.1, 12.2 and 12.3 and the calculation unit 5 may be combined to one unit performing the tasks of the units 12.1, 12.2, 12.3 and 5.

From FIG. 7 it becomes clear that the generation of the weighting factors $w_{1,1}$ and $w_{2,1}$ depends on signals coming from more than one antenna. In contrast to this, each of the weighting factors employed by the weighting units 9.1 to 9.N of FIG. 2 merely depends on signals coming from only one antenna. Since the weighting factor unit 11.1 takes into account signals coming from more than one antenna, correlation between received signals of the two antennas 4.1 and 4.2 may be exploited for interference whitening and interference cancellation.

A mathematical scheme for generating the weighting factors as they may be generated by the weighting factor unit 11.1 of FIG. 8 according to one embodiment will be explained in the following. A radio signal y received at the first antenna 4.1 and despread by the first RAKE finger 7.1.1 may be written as $$y_{1,1}=h_{1,1}s+f_{1,1}+n_{1,1}=h_{1,1}s+e_{1,1} \tag{1}$$

Here, h denotes the channel weight associated with the transmitted radio signal, s denotes the transmitted radio signal, f denotes the interference and n denotes the noise. The interference f and the noise n may be combined to e (interference plus noise). The quantities $y_{i,j}$, $h_{i,j}$, $f_{i,j}$ and $n_{i,j}$ depend on the considered antenna and the considered RAKE finger, with a first index i denoting the considered antenna and a second index j denoting the considered RAKE finger. Similarly, a radio signal y received at the second antenna 4.2 and processed in the RAKE finger 7.1.2 may be written as $$y_{2,1}=h_{2,1}s+f_{2,1}+n_{2,1}=h_{2,1}s+e_{2,1} \tag{2}$$

For further considerations, the discussed quantities may also be written in the form of vectors:

$$Y=\begin{pmatrix} y_{1,1} \\ y_{2,1} \end{pmatrix};\quad H=\begin{pmatrix} h_{1,1} \\ h_{2,1} \end{pmatrix};\quad f=\begin{pmatrix} f_{1,1} \\ f_{2,1} \end{pmatrix};\quad n=\begin{pmatrix} n_{1,1} \\ n_{2,1} \end{pmatrix} \tag{3}$$

The cross-correlation vector $R_{SY}$ reads $$R_{SY}=E[SY^+]=[h_{1,1}{}^*h_{2,1}{}^*]=H^+, \tag{4}$$

with the superscript "+" denoting hermitian transposition, the superscript "*" denoting complex conjugation and the function E[ ] denoting the expectation value.

The corresponding auto-correlation matrix $R_Y$ reads $$R_Y=\begin{pmatrix} R_{1,1} & R_{1,2} \\ R_{1,2}^* & R_{2,2} \end{pmatrix}=E[YY^+]=HH^++R_E, \tag{5}$$

wherein the matrix $R_E$ denotes the auto-correlation matrix of interference plus noise e. $R_E$ merely holds diagonal entries. The individual coefficients of the matrix $R_Y$ read $$R_{i,j}=E[y_{i,1}y_{j,1}{}^*]. \tag{6}$$

The inverted auto-correlation matrix reads $$R_Y^{-1}=\frac{1}{R_{1,1}R_{2,2}-|R_{1,2}|^2}\begin{bmatrix} +R_{2,2} & -R_{1,2} \\ -R_{1,2}^* & +R_{1,1} \end{bmatrix}. \tag{7}$$

The MMSE (Minimum Mean Square Error) estimate of the transmitted signal s reads $$S_{MMSE}=R_{SY}R_Y{}^{-1}Y=w^+Y, \tag{8}$$

wherein w denotes a weighting vector comprising the two weighting factors $w_{1,1}$ and $w_{2,1}$ (cf. for example FIG. 8)

$$w=\begin{pmatrix} w_{1,1} \\ w_{2,1} \end{pmatrix}. \tag{9}$$

Combining equations (4) and (8) leads to a relation which may be used for calculating the weighting factors $$w^+=R_{SY}R_Y{}^{-1}=H^+R_Y{}^{-1}. \tag{10}$$

Applying the weighting vector w of equation (10) to the received signal Y corresponds to an MMSE filtering which may also be referred to as Wiener filtering. The calculation of the weighting vector w according to equation (10) represents an optimal scaling for combining the RAKE fingers 7.1.1 and 7.1.2 in view of minimizing the mean square error. The above mathematical scheme shows that the weighting factors $w_{1,1}$ and $w_{2,1}$ may be calculated based on the vector of channel weights H and the auto-correlation matrix $R_Y$.

The scaled signal $S_{MMSE}$ may be written as $$S_{MMSE}=R_{SY}R_Y^{-1}Y=(H^+R_E^{-1}H+I)^{-1}H^+R_E^{-1}Y, \tag{11}$$

wherein $(H^+R_E^{-1}H+I)^{-1}$ denotes to a scalar factor, $H^+$ corresponds to a channel matched filter and $R_E^{-1}$ corresponds to noise whitening. The signal to interference plus noise ratio $SINR_{MMSE}$ for each double finger can be estimated based e.g. on the DPCH pilot symbols or may be calculated. The SINR estimation is considered to provide corresponding inputs to the combiner unit, where the optimum weighting and combination of the individual double finger contributions is performed.

Then, the optimum scaled estimate for an MRC may be written as $$S_{MRC}=SINR_{MMSE}S_{MMSE}. \tag{12}$$

According to equation (5), the quantity $R_E$ may be obtained via $$R_E=R_Y-HH^+ \tag{13}$$

and the vector w comprising the weighting factors then reads $$w=H^+R_E^{-1}. \tag{14}$$

The described mathematical scheme provides weighting factors for the case of two different antennas 4.1 and 4.2. Naturally, this scheme leads to 2-component vectors and (2×2)-matrices. It is understood that the described mathematical scheme may be generalized to a plurality of N antennas in a straightforward way. For the case of N antennas, the quantities of equations (1) to (14) then simply turn to N-components vectors and (N×N)-matrices.

Figure 9:
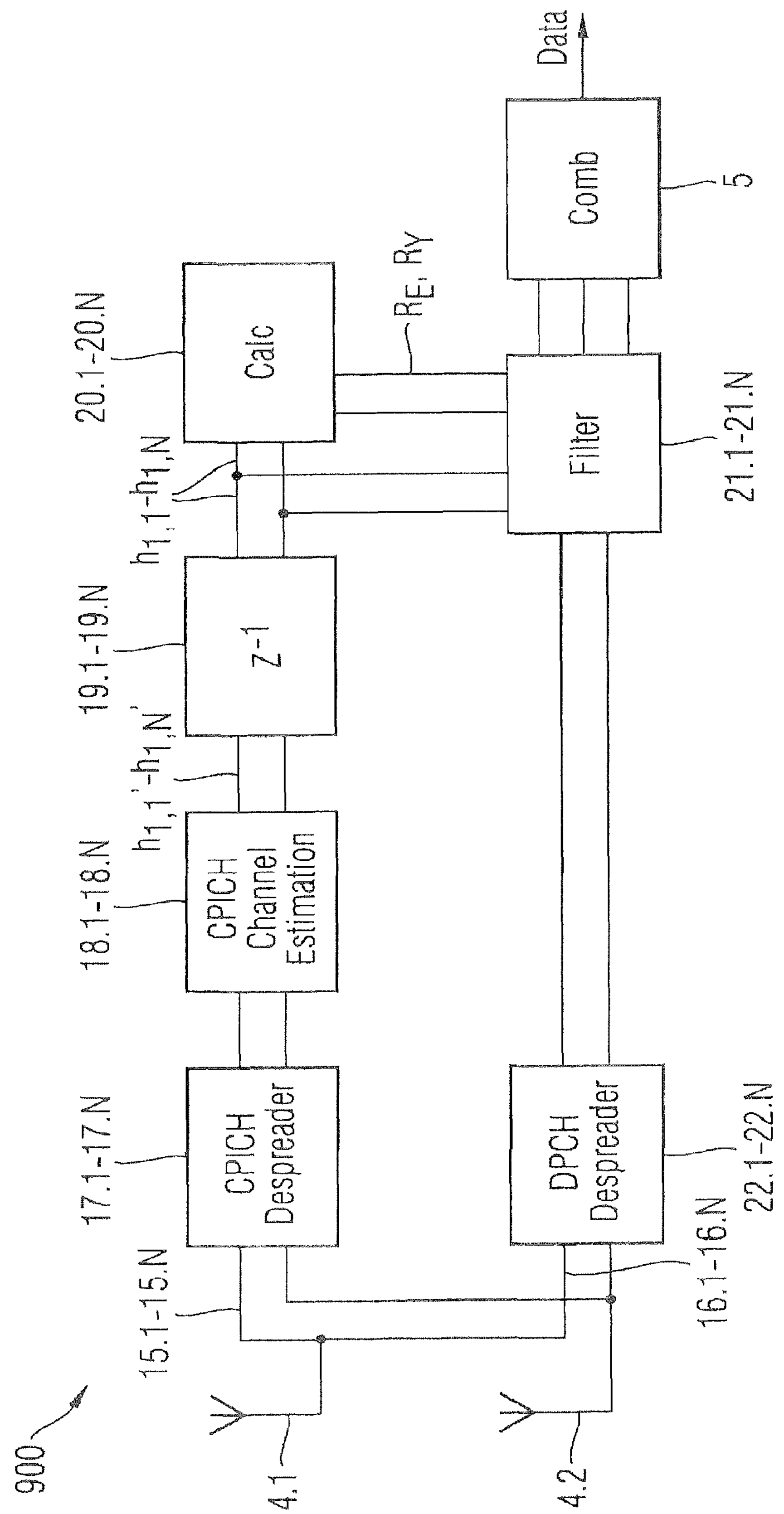
FIG. 9 schematically illustrates a receiver 900 as a further exemplary embodiment.

FIG. 9 schematically illustrates a receiver 900 as a further exemplary embodiment. The receiver 900 includes two antennas 4.1 and 4.2. The first antenna 4.1 is coupled to an upper set of N signal paths 15.1 to 15.N and a lower set of N signal paths 16.1 to 16.N. Again, N corresponds to a number of considered transmission paths or RAKE fingers. For the sake of simplicity, the pluralities of signals paths 15.1 to 15.N and 16.1 to 16.N are indicated by single lines, i.e. not every single signal path is explicitly illustrated. Each of the upper signal paths 15.1 to 15.N may include a despreader 17.1 to 17.N configured to despread signals transmitted over a common pilot channel (CPICH), a channel estimation unit 18.1 to 18.N configured to estimate channel weights of signals transmitted over CPCH and a delay element 19.1 to 19.N (the delay elements 19.1 to 19.N may also be omitted). The output of each delay element 19.1 to 19.N is coupled to a calculation unit 20.1 to 20.N configured to generate coefficients of auto-correlation matrices. The output of each delay element 19.1 to 19.N is further coupled to a filter unit 21.1 to 21.N configured to filter signals.

Each of the lower signal paths 16.1 to 16.N may include a despreader 22.1 to 22.N configured to despread signals transmitted over a downlink dedicated physical channel (DPCH). The output of each despreader 22.1 to 22.N is coupled to one of the filter units 21.1 to 21.N. The outputs of the filter units 21.1 to 21.N are coupled to a combining unit 5. The output of the combining unit 5 may be coupled to further units of the receiver 900, for example a digital signal processor.

The antenna 4.1 receives radio signals which may contain data transmitted over CPICH and DPCH. The data received over CPICH are processed in the upper N signal paths 15.1 to 15.N, while the data received over DPCH are processed in the lower signal paths 16.1 to 16.N. The CPICH signals are despread by the despreader 17.1 to 17.N, wherein each of the despreaders 17.1 to 17.N may be included in a respective RAKE finger. Each of the despread CPICH signals is forwarded to a respective channel estimation unit 18.1 to 18.N, wherein each of the channel estimation units 18.1 to 18.N estimates channel weights for the despread CPICH signals. This leads to N (undelayed) channel weights $h_{1,1}'$ to $h_{1,N}'$.

Each of the channel weights $h_{1,1}'$ to $h_{1,N}'$ is delayed by a respective delay element 19.1 to 19.N. The delay corresponds to one channel estimation interval which in particular may correspond to 256 chips or 2560 chips. The N outputs $h_{1,1}$ to $h_{1,N}$ of the delay elements 19.1 to 19.N represent channel weights of radio signals received at the first antenna 4.1 and processed in the corresponding N signal paths 15.1 to 15.N. For the case of the receiver 900, the described channel estimation is based on data transmitted over CPICH. Each of the outputs $h_{1,1}$ to $h_{1,N}$ corresponds to the first entry of a vector H according to equation (3) and is forwarded to a respective calculation unit 20.1 to 20.N.

Similar to the antenna 4.1, the antenna 4.2. receives radio signals which are processed in a plurality of N upper signal paths and in a plurality of N lower signal paths. Since processing signals received at antenna 4.1 is similar to processing signals received at antenna 4.2, further reference signs and comments on the procession of the signals received at the antenna 4.2 are omitted. In a similar way, the procession of radio signals received at the antenna 4.2 results in channel weights $h_{2,1}$ to $h_{2,N}$ which are forwarded to the calculation units 20.1 to 20.N as well. Each of the channel weights $h_{2,1}$ to $h_{2,N}$ corresponds to the second entry of a vector H of equation (3).

Each of the calculation units 20.1 to 20.N calculates auto-correlation matrices $R_Y$ and $R_E$ according to equation (5). A more detailed description on such a calculation will be given in connection with FIGS. 10 and 11. The auto-correlation matrices $R_Y$ and $R_E$ are forwarded from each calculation unit 20.1 to 20.N to a respective filter unit 21.1 to 21.N. Further, the channel weights $h_{1,1}$ to $h_{1,N}$ and $h_{2,1}$ to $h_{2,N}$ are sent to the filter units 21.1 to 21.N as well. In a next step, each of the filter units 21.1 to 21.N filters the despread CPICH signals using weighting factors calculated according to equation (10) or equation (14). The received DPCH signals despread by the despreaders 22.1 to 22.N are filtered in the same way. The outputs of the filters 21.1 to 21.N are then combined by the combining unit 5 in a way that has already been described in connection with previous figures. It is to be noted that a comparison of the receivers 700 and 900 shows that the calculation unit 12.1 of FIG. 7 may be identified with a combination of the units 20.1 and 21.1 of FIG. 9.

Figure 10:
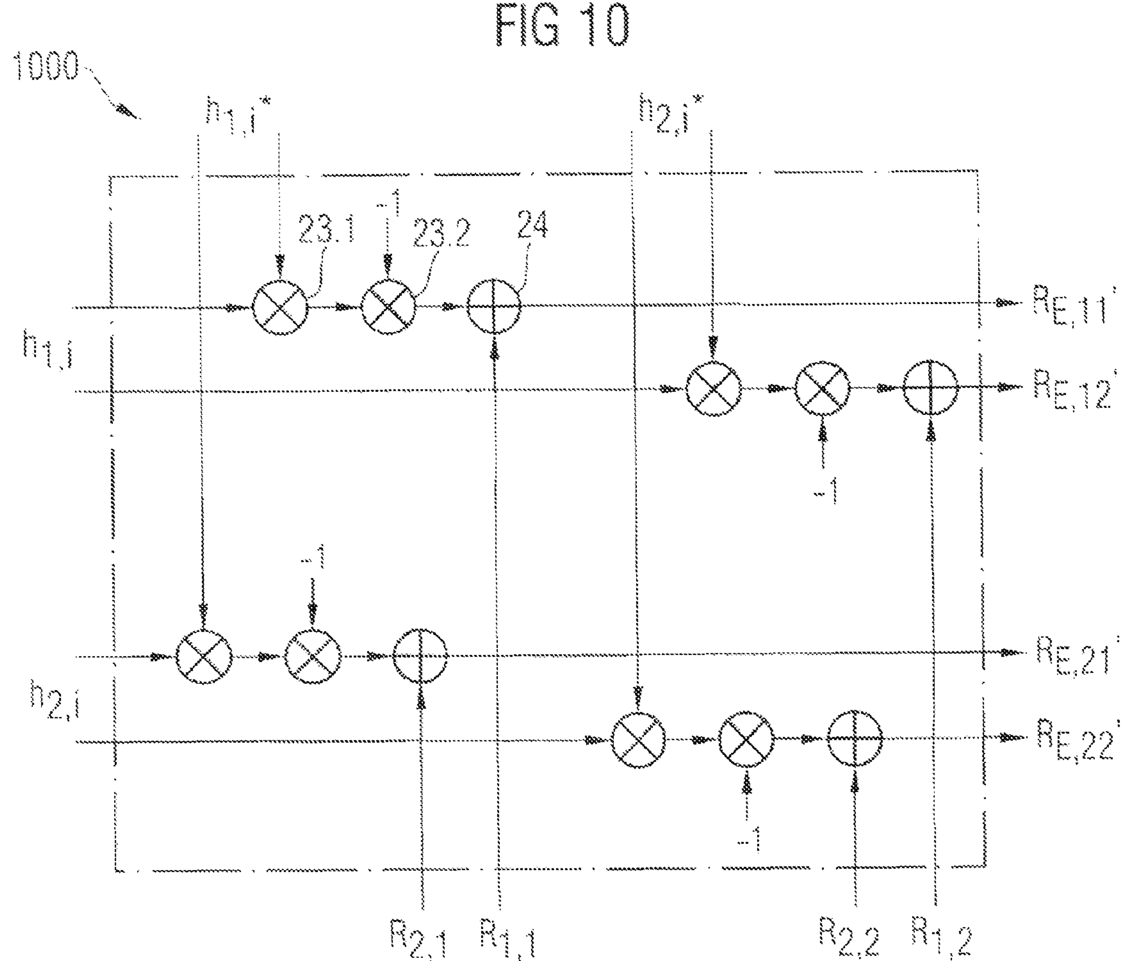
FIG. 10 schematically illustrates a calculation unit 1000.

FIG. 10 schematically illustrates a calculation unit 1000. The calculation unit 1000 provides a calculation of an auto-correlation matrix $R_E'$ of noise plus interference based on equation (13) according to one embodiment. The calculation unit 1000 has various inputs to receive channel weights $h_{1,i}$ and $h_{2,i}$ (associated with the i-th transmission path and the two antennas 4.1 and 4.2), the complex conjugates $h_{1,i}$* and $h_{2,i}$* of these channel weights and the entries $R_{1,1}$, $R_{1,2}$, $R_{2,1}$ and $R_{2,2}$ of the auto-correlation matrix $R_y$, which are obtained based on equation (6). The coefficients $R_{E,11}$, $R_{E,12}$, $R_{E,21}$ and $R_{E,22}$ of the (yet unfiltered) auto-correlation matrix $R_E'$ are calculated in a straightforward way according to equation (13). For example, the coefficient $R_{E,11}'$ is calculated via $$R_{E,11}'=R_{1,1}-h_{1,i}h_{1,i}^* \tag{15}$$

using the multipliers 23.1 and 23.2 and the adder 24. The calculation of the remaining coefficients of the auto-correlation matrix $R_E'$ may directly be seen from FIG. 10.

Figure 11:
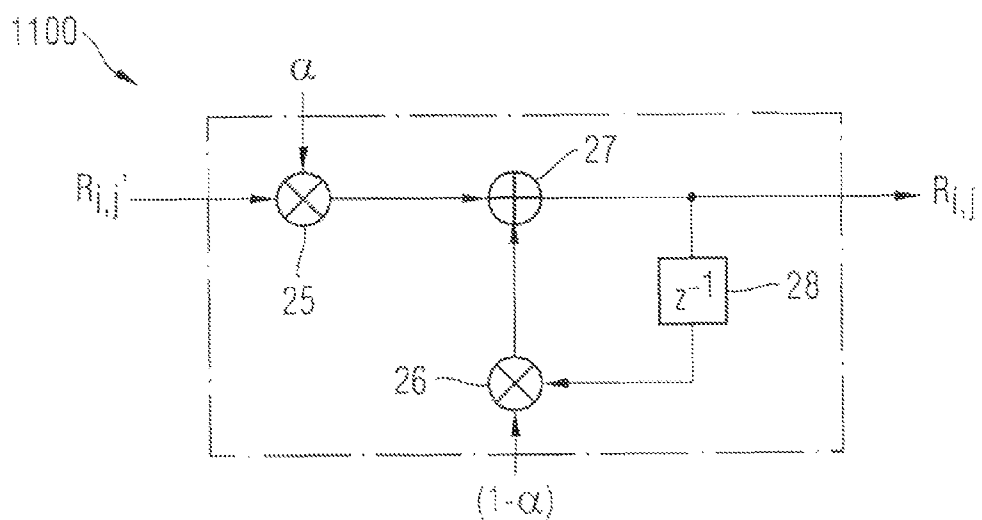
FIG. 11 schematically illustrates an IIR (Infinite Impulse Response) filter 1100.

FIG. 11 schematically illustrates an IIR (Infinite Impulse Response) filter 1100 as it may be used in the receiver 900 according to one embodiment. The IIR filter 1100 may be used for filtering the (yet unfiltered) coefficients of the auto-correlation matrix $R_E'$ as they may be output by the calculation unit 1000 of FIG. 10. The IIR filter 1100 includes multipliers 25, 26, an adder 27 and a delay element 28. The multiplier 25 performs a multiplication of a signal with a factor α, while the multiplier 26 performs a multiplication with a factor 1-α. Here, $0<\alpha\leqq 1$. The IIR filter 1100 receives a (yet unfiltered) coefficient of the auto-correlation matrix $R_E'$ and performs a filtering corresponding to the arrangement 1100 of FIG. 11. The coefficient of the filtered auto-correlation matrix $R_E$ is output at an output of the IIR filter 1100.

Figure 12:
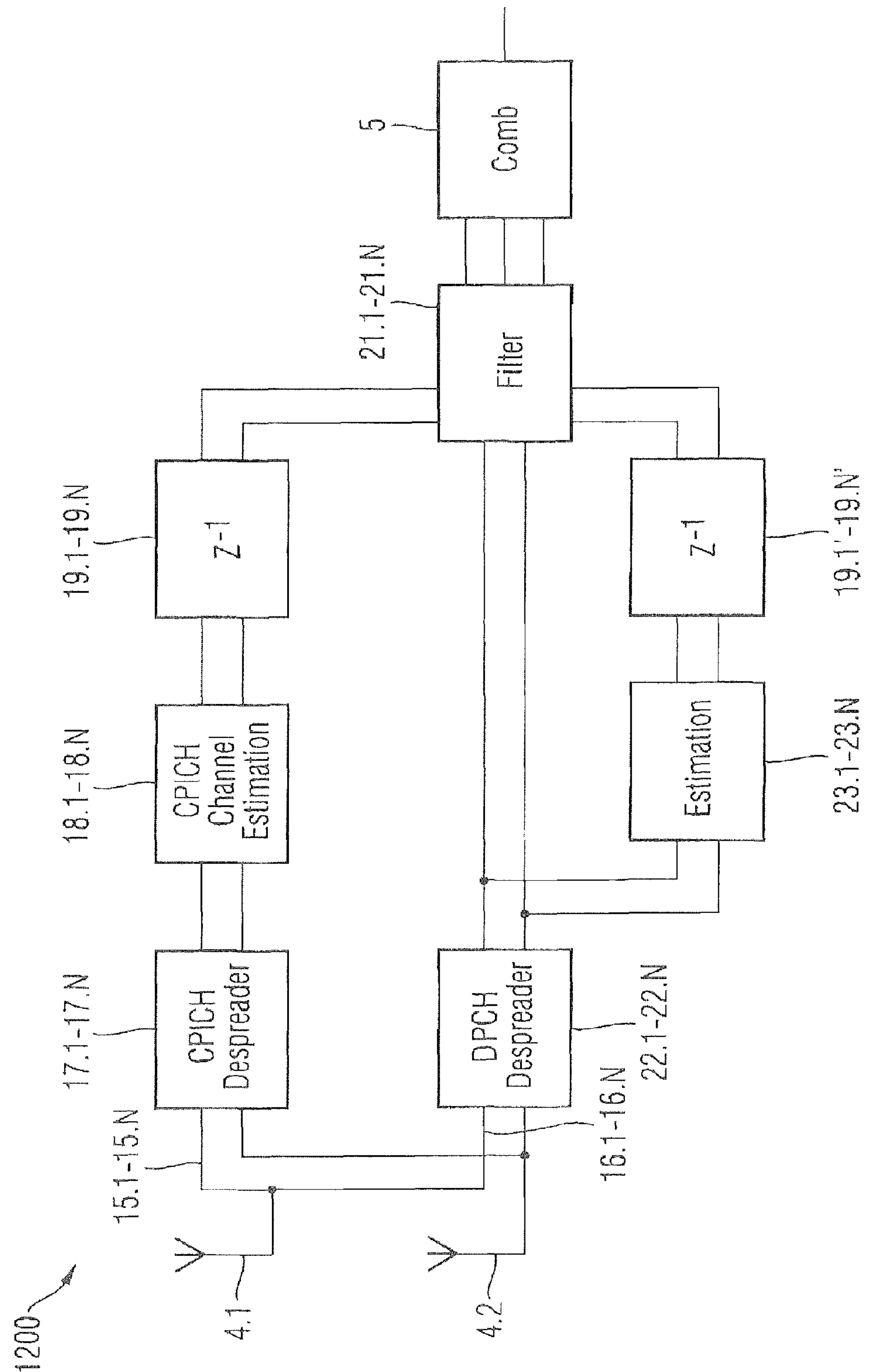
FIG. 12 schematically illustrates a receiver 1200 as a further exemplary embodiment.

FIG. 12 schematically illustrates a receiver 1200 as a further exemplary embodiment. The receiver 1200 has two antennas 4.1 and 4.2. The first antenna 4.1 is coupled to an upper set of N signal paths 15.1 to 15.N and a lower set of signal paths 16.1 to 16.N. Again, N corresponds to the number of considered transmission paths or RAKE fingers. For the sake of simplicity, the pluralities of signals paths 15.1 to 15.N and 16.1 to 16.N are indicated by single lines, i.e. not every single signal path is explicitly illustrated. Each of the upper signal paths 15.1 to 15.N may include a despreader 17.1 to 17.N configured to despread signals transmitted over a common pilot channel (CPICH), a channel estimation unit 18.1 to 18.N configured to estimate channel weights of signals transmitted over CPICH and a delay element 19.1 to 19.N (the delay elements 19.1 to 19.N may also be omitted). The output of each delay element 19.1 to 19.N is coupled to a filter unit 21.1 to 21.N configured to filter signals.

Each of the lower signal paths 16.1 to 16.N may include a despreader 22.1 to 22.N configured to despread signals transmitted over a downlink dedicated physical channel (DPCH). Each of the despreaders 22.1 to 22.N includes a first output coupled to one of a plurality of estimation units 23.1 to 23.N configured to channel estimate the coefficients of auto-correlation matrices. A second output of the despreaders 22.1 to 22.N are coupled to one of a plurality of filter units 21.1 to 21.N. Each of the estimation units 23.1 to 23.N is coupled to one of N delay elements 19.1' to 19.N', which in turn are coupled to the respective filter units 21.1 to 21.N (the delay elements 19.1' to 19.N' may also be omitted). The outputs of the filter units 21.1 to 21.N are coupled to a combining unit 5. The output of the combining unit 5 may be coupled to further units of the receiver 1200, for example a digital signal processor.

The antenna 4.1 receives radio signals which may contain data transmitted over CPICH and DPCH. The data transmitted over CPICH are processed in the upper N signal paths 15.1 to 15.N, while the data transmitted over DPCH are processed in the lower signal paths 16.1 to 16.N. The CPICH signals are despread by the despreader 17.1 to 17.N, wherein each of the despreaders 17.1 to 17.N may be included in a RAKE finger. Each of the despread CPICH signals is forwarded to a respective channel estimation unit 18.1 to 18.N, with each of the channel estimation units 18.1 to 18.N estimating channel weights for the despread CPICH signals. This leads to N (undelayed) channel weights $h_{1,1}'$ to $h_{1,N}'$.

Each of the channel weights $h_{1,1}'$ to $h_{1,N}'$ is delayed by a respective delay element 19.1 to 19.N. The delay corresponds to one channel estimation interval which in particular may correspond to 256 chips or 2560 chips. The outputs $h_{1,1}$ to $h_{1,N}$ of the delay elements 19.1 to 19.N represent channel weights of radio signals received at the first antenna 4.1 and processed in the corresponding N signal paths 15.1 to 15.N. For the case of the receiver 1200, the described channel estimation for the channel weights $h_{1,1}$ to $h_{1,N}$ is based on data transmitted over a common pilot channel. Each of the outputs $h_{1,1}$ to $h_{1,N}$ corresponds to the first entry of a vector H according to equation (3) and forwarded to a respective of the filter units 21.1 to 21.N.

Similar to the antenna 4.1, the antenna 4.2. receives radio signals which are processed in a plurality of N upper signal paths and in a plurality of N lower signal paths. Since the procession of the signals received at the antennas 4.1 and 4.2 is similar, further reference signs and comments on the signal procession of signals received at the antenna 4.2 are omitted. In a similar way, the procession of the signals received at the antenna 4.2 results in channel weights $h_{2,1}$ to $h_{2,N}$ forwarded to the filter units 21.1 to 21.N as well. Each of the channel weights $h_{2,1}$ to $h_{2,N}$ corresponds to the second entry of a vector H according to equation (3).

The data received at antenna 4.1 and transmitted over DPCH are processed in the lower N signal paths 16.1 to 16.N. The DPCH signals are despread by the despreader 22.1 to 22.N with each of the despreaders corresponding to a specific transmission path. Each of the N despread DPCH signals is forwarded to a respective estimation unit 23.1 to 23.N configured to estimate the coefficients of the auto-correlation matrices $R_Y$ and $R_E$ associated with the first antenna 4.1. Each of the estimated coefficients is delayed by a respective one of the delay elements 19.1' to 19.N'. The delay corresponds to one channel estimation interval that may in particular contain 256 chips or 2560 chips. The outputs of the delay elements 19.1' to 19.N' represent channel estimated auto-correlation coefficients of radio signals received at the first antenna 4.1. For the case of the receiver 1200, the channel estimation for the auto-correlation coefficients is based on data transmitted over DPCH. Each of the coefficients is forwarded to a respective filter unit 21.1 to 21.N.

In a similar way, the procession of the signals received at the antenna 4.2 results in coefficients of the auto-correlation matrices $R_Y$ and $R_E$ associated with the antenna 4.2. These coefficients are forwarded to a respective filter unit 21.1 to 21.N as well. In a next step, each of the filter units 21.1 to 21.N filters the despread CPICH signals using weighting factors calculated according to equation (10) or equation (14). The DPCH signals which have been despread by the despreaders 22.1 to 22.N are filtered in the same way. The outputs of the filters 21.1 to 21.N are then combined by the combining unit 5 as it has already been described in previous figures. A comparison of the receivers 700 and 1200 shows that the calculation unit 12.1 of FIG. 7 may be identified with a combination of the units 20.1 and 21.1 of FIG. 12.

Figure 13:
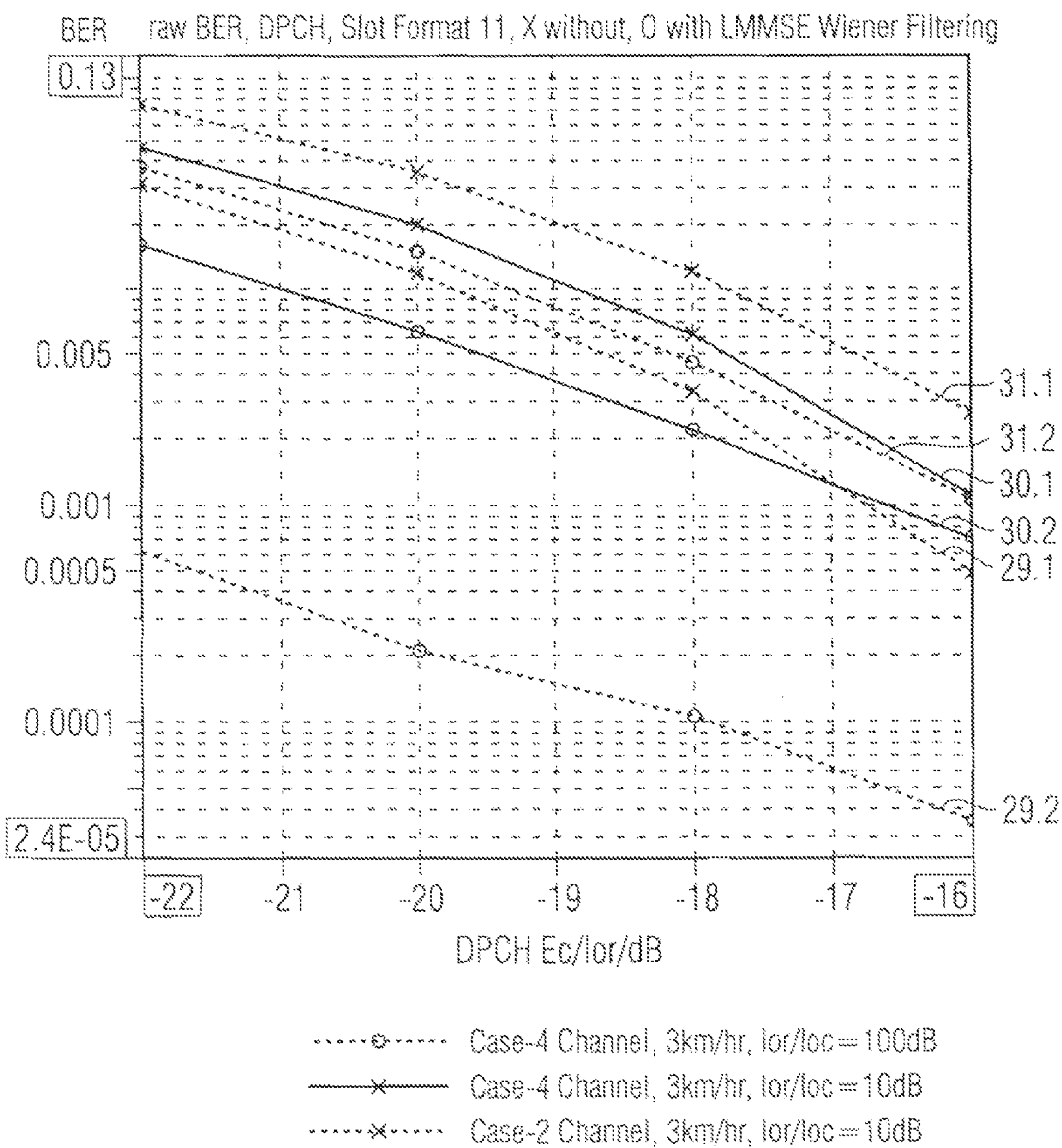
FIG. 13 schematically illustrates the uncoded bit error performance of various receivers.

FIG. 13 schematically illustrates the uncoded bit error performance of various receivers, wherein the illustrated graphs show the uncoded bit error rate (BER) versus the quantity $E_c/I_{or}$ (known from the CDMA standard). The curve 29.1 shows the uncoded bit error performance for the case of a receiver similar to FIG. 2, a Case-4 channel with two multipaths and the value of $I_{or}/I_{oc}$ (known from the CDMA standard) being 100 db. The curve 29.2 shows an uncoded bit error performance for the case of a receiver similar to, for example, FIG. 7, a Case-4 channel with two multipaths and the value of $I_{or}/I_{oc}$ being 100 db. In this noise-free scenario, the interference is well eliminated for the case of a receiver similar to FIG. 7. The SNR (Signal-to-Noise Ratio) gains exceeding 5 db are achieved at an uncoded bit error rate of 1e-3.

The curve 30.1 shows the uncoded bit error performance for the case of a receiver similar to FIG. 2, a Case-4 channel and the value of $I_{or}/I_{oc}$ being 10 db. The curve 30.2 shows an uncoded bit error performance for the case of a receiver similar to, for example, FIG. 7, a Case-4 channel and the value of $I_{or}/I_{oc}$ being 10 db. This scenario corresponds to adding uncorrelated white noise to both branches. Since the receiver 700 is not capable of canceling uncorrelated noise or interference, the gains are reduced. The gain is still around 2 dB at an uncoded bit error rate of 1e-2.

The curve 31.1 shows the uncoded bit error performance for the case of a receiver similar to FIG. 2, a Case-2, three path channel and the value of $I_{or}/I_{oc}$ being 10 db. The curve 31.2 shows an uncoded bit error performance for the case of a receiver similar to, for example, FIG. 7, a Case-2, three path channel and the value of $I_{or}/I_{oc}$ being 10 db. Here, the gain is around 1.5 dB at an uncoded bit error rate of 1e-2.

The examples above focus on multipath interference. It is to be noted that the receiver similar to FIG. 7 performs equally well if the correlated interference is represented by inter-cell interference from adjacent cells, i.e. at the cell edge, or by any other type of correlated interference. The receiver similar to FIG. 7 automatically adapts to the currently largest sources of interference.

Figure 14:
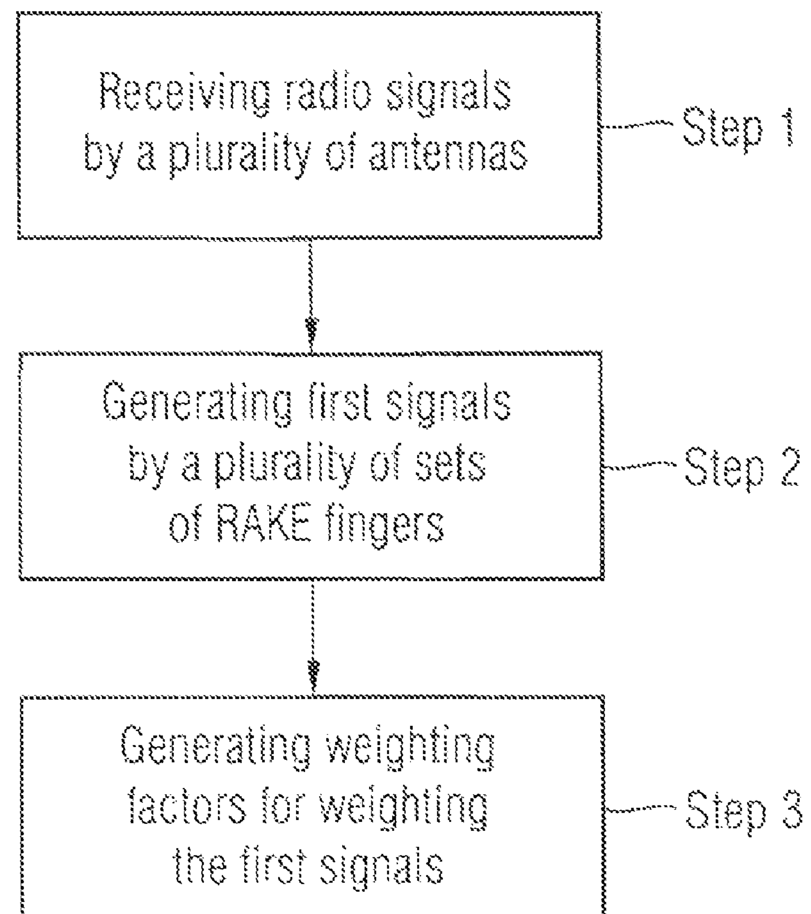
FIG. 14 schematically illustrates a method 1400.

FIG. 14 shows a flow chart illustrating a method 1400. The flow chart of FIG. 14 may, for example be read in connection with the receiver 400 of FIG. 4 in one embodiment, but is not so limited. In a first method step, radio signals are received by a plurality of antennas 4.1 to 4.M. The received radio signals are transmitted over a plurality of transmission paths. In a second method step, first signals are generated by a plurality of sets of RAKE fingers 7.1.1 to 7.N.M, wherein each set of RAKE fingers is coupled to a respective one of the antennas 4.1. to 4.M. For example, the set of RAKE fingers 7.1.1 to 7.N.1 is coupled to the antenna 4.1. In a third method step, weighting factors for weighting the first signals are generated. In FIG. 7 the generation of weighting factors is indicated by the generated weighting factor $w_{1,1}$ (cf. also description of FIG. 7). The weighting factor for one of the first signals is generated by using first signals generated by at least two of the plurality of sets of RAKE fingers, and at least two of the first signals used to generate the weighting factor are received from the same transmission path.

Figure 15:
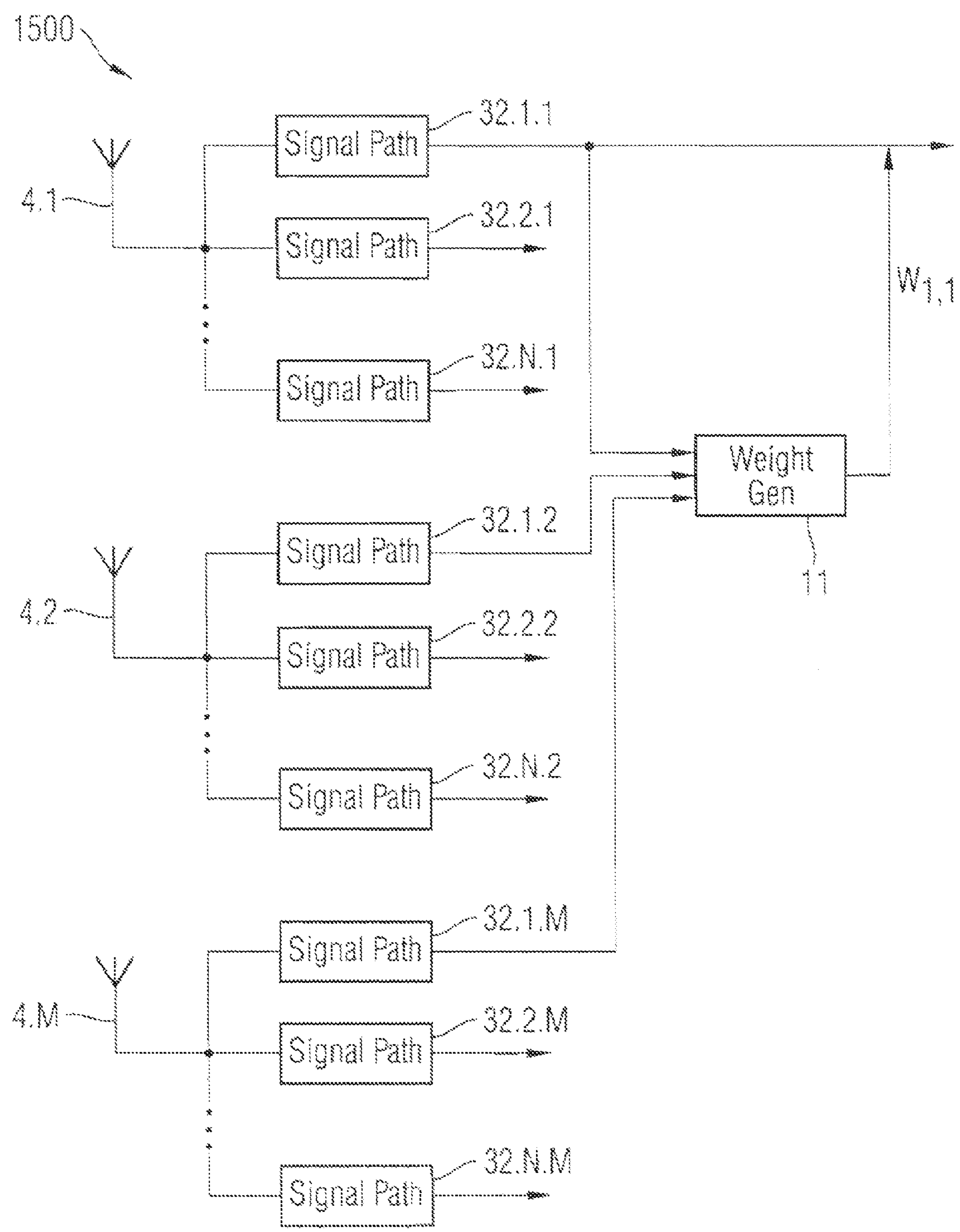
FIG. 15 schematically illustrates a receiver 1500 as an exemplary embodiment.

FIG. 15 schematically illustrates a receiver 1500 as an exemplary embodiment. The receiver 1500 includes M antennas 4.1 to 4.M to receive radio signals comprising a plurality of carrier frequencies. For example, the received radio signals may be transmitted using an OFDM (Orthogonal Frequency Division Multiplex) scheme employing various orthogonal frequencies. The receiver 1500 further comprises a plurality of sets of signal paths 32.1.1 to 32.N.M to generate first signals. Here, each of the signal paths of one set is assigned to one of the plurality of carrier frequencies. For example, the received radio signal comprising a plurality of carrier frequencies may be transformed into a plurality of signals by means of a FFT (Fast Fourier Transformation) unit (not shown), wherein each of the generated signals is assigned to one specific frequency. Each set of signal paths 32.1.1 to 32.N.M is coupled to a respective one of the plurality of antennas 4.1 to 4.M.

The receiver 1500 further includes a weighting factor generator 11 to generate weighting factors for weighting the first signals, wherein the weighting factor for one of the first signals is generated by using first signals generated by at least two of the plurality of sets of signal paths and at least two of the first signals used to generate the weighting factor are received from the same carrier frequency. The internal structure of the weighting factor generator 11 is not explicitly illustrated in FIG. 15. The weighting factor generator 11 may be implemented in various ways. One example may be implemented similar to the unit 12.1 illustrated in FIG. 8.

Exemplarily, the outputs of the signal paths 32.1.1, 32.1.2 and 32.1.M are fed into the weighting factor generator 11. The weighting factor generator 11 calculates and outputs a weighting factor $w_{1,1}$ to weight the first signal received at the antenna 4.1 and processed in the signal path 32.1.1. It is understood that the weighting factor $w_{1,1}$ may also be generated using the output of other signal paths.

It can be seen from FIG. 15 that the generated weighting factor $w_{1,1}$ depends on signals processed in at least two of the plurality of sets of signal paths. That is, the generation of the weighting factor $w_{1,1}$ depends on signals coming from more than one antenna. Since the weighting factor unit 11 takes into account signals coming from more than one antenna, correlation between received signals of the two antennas 4.1 and 4.2 may be exploited for interference cancellation.

The details of the receiver 400 set forth above can be likewise applied to the receiver 1500. In this case, the RAKE fingers of FIG. 4 correspond to the signal paths of FIG. 15. That is, the transmission paths regarded in connection with the receiver 400 correspond to the carrier frequencies regarded in connection with the receiver 1500.

Although specific embodiments have been illustrated and described, it will be appreciated by one of ordinary skill in the art that any arrangement which is calculated to achieve the same purpose may be substituted for the specific embodiment shown. It is to be understood that the above description is intended to be illustrative and not restrictive. The application is intended to cover any variations of the invention. The scope of the invention includes any other embodiments and applications in which the above structures and methods may be used. The scope of the invention should therefore be determined with reference to the appended claims along with the scope of equivalence to which such claims are entitled.

It is emphasized that the abstract is provided to comply with 37 CFR. Section 1.72(b) requiring an abstract that will allow the reader to quickly ascertain the nature and gist of a technical disclosure. It is submitted with the understanding that it will not be used to interpret or limit the scope of meaning of the claims.

What is claimed is:

1. A receiver, comprising:

a plurality of antennas ports each configured to receive radio signals from a plurality of transmission paths;

a plurality of sets of RAKE fingers configured to generate at least one first signal, each set of RAKE fingers coupled to a respective one of the plurality of antenna ports, wherein each of the RAKE fingers of one set of RAKE fingers correspond to a respective RAKE finger of another set of RAKE fingers and to one of the plurality of transmission paths;

a weighting factor generator configured to generate at least one weighting factor for weighting the at least one first signal to form second signals, wherein the at least one weighting factor is generated by using the at least one first signal generated by corresponding RAKE fingers from each set of RAKE fingers in the plurality of sets of RAKE fingers; and a signal to interference plus noise ratio estimator for corresponding RAKE fingers configured to estimate a signal to interference plus noise ratio, wherein the estimated signal to interference plus noise ratio is used by the weighting factor generator to weight the second signals.

2. The receiver of claim 1, further comprising:

the weighting factor generator being configured to generate the at least one weighting factor by using only first signals generated by corresponding RAKE fingers from each set of RAKE fingers.

3. The receiver of claim 1, further comprising:

M being the number of the plurality of antenna ports; and wherein the weighting factor generator is configured to generate at least one complex weight vector, the complex weight vector comprising M complex weight factors.

4. The receiver of claim 1, wherein the at least one first signal comprises a plurality of first signals, and further comprising:

a first unit configured to weight the first signals with the at least one weighting factor and combine the weighted first signals to form second signals.

5. The receiver of claim 4, wherein the first unit combines the weighted plurality of first signals that are assigned to the same transmission path of the received radio signals to form the second signals.

6. The receiver of claim 4, further comprising:

a second unit configured to combine the second signals to form third signals.

7. The receiver of claim 1, wherein the weighting factor for one of the first signals depends on a cross-correlation vector.

8. The receiver of claim 1, further comprising:

a unit configured to generate coefficients of a cross-correlation vector by a channel estimation based on symbols of the dedicated channel.

9. The receiver of claim 1, further comprising:

a unit configured to generate coefficients of a cross-correlation vector by a channel estimation based on symbols of the pilot channel.

10. The receiver of claim 1, wherein the at least one first signal comprises a plurality of first signals, and wherein the weighting factor for one of the first signals depends on an auto-correlation matrix.

11. The receiver of claim 10, further comprising:

a unit configured to generate coefficients of the auto-correlation matrix by a calculation based on coefficients of an associated cross-correlation vector.

12. The receiver of claim 1, wherein the at least one weighting factor is generated by the weighting factor generator by using the at least one first signal generated by solely corresponding RAKE fingers from each set of RAKE fingers in the plurality of sets of RAKE fingers.

13. The receiver of claim 6, wherein the second unit is configured to receive the estimated signal to interference plus noise ratio from the estimator.

14. A method, comprising:

receiving radio signals from a plurality of transmission paths through a plurality of antenna ports;

establishing a plurality of sets of RAKE fingers, each set of RAKE fingers coupled to a respective one of the plurality of antenna ports, and wherein each of the RAKE fingers of one set of RAKE fingers correspond to a respective RAKE finger of another set of RAKE fingers and to one of the plurality of transmission paths;

generating at least one first signal using the plurality of sets of RAKE fingers;

generating at least one weighting factor for weighting the at least one first signal to form second signals, wherein the at least one weighting factor is generated by using the at least one first signal generated by solely corresponding RAKE fingers in the plurality of sets of RAKE fingers;

estimating or calculating a signal to interference plus noise ratio for corresponding RAKE fingers in the plurality of sets of RAKE fingers; and weighting the second signals by using the signal to interference plus noise ratio for corresponding RAKE fingers in the plurality of sets of RAKE fingers.

15. The method of claim 14, further comprising:

generating the at least one weighting factor by using only first signals generated by corresponding RAKE fingers from each set of RAKE fingers.

16. The method of claim 14, further comprising:

receiving the radio signals at M antenna ports; and generating at least one complex weight vector, the complex weight vector comprising M complex weight factors.

17. The method of claim 16, wherein the at least one first signal comprises a plurality of first signals, and further comprising weighting the first signals with weighting factors, wherein the weighted first signals assigned to the same transmission path of the received radio signals are combined to form second signals.

18. The method of claim 17, wherein the second signals are combined to form third signals.

19. The method of claim 14, wherein the weighting factor for one of the at least one first signals depends on a cross-correlation vector.

20. The method of claim 14, further comprising:

generating coefficients of a cross-correlation vector by a channel estimation based on symbols of the dedicated channel.

21. The method of claim 14, further comprising:

generating coefficients of a cross-correlation vector by a channel estimation based on symbols of the pilot channel.

22. A receiver, comprising:

a first antenna port and a second antenna port configured to receive radio signals from a plurality of transmission paths, wherein the received radio signals comprise symbols transmitted over a CPICH channel and comprise symbols transmitted over a DPCH channel;

a plurality of first CPICH despreaders, coupled to the first antenna port configured to generate first despread CPICH signals from the symbols transmitted over the CPICH channel;

a plurality of second CPICH despreaders, coupled to the second antenna port, configured to generate second despread CPICH signals from the symbols transmitted over the CPICH channel;

a plurality of first DPCH despreaders, coupled to the first antenna port, configured to generate first despread DPCH signals from the symbols transmitted over the DPCH channel;

a plurality of second DPCH despreaders, coupled to the second antenna port, configured to generate second despread DPCH signals from the symbols transmitted over the DPCH channel;

a plurality of CPICH channel estimation units configured to estimate first channel weights of radio signals received at the first antenna port based on the first despread CPICH signals and configured to estimate second channel weights of radio signals received at the second antenna port based on the second despread CPICH signals;

a plurality of estimation units configured to estimate coefficients of first auto-correlation matrices of radio signals received at the first antenna port based on the first despread DPCH signals and configured to estimate coefficients of second auto-correlation matrices of radio signals received at the second antenna port based on the second despread DPCH signals; and a plurality of filter units configured to filter the received radio signals depending on the first and second channel weights and the coefficients of the first and second auto-correlation matrices.

23. The receiver of claim 22, further comprising:

a plurality of first delay units configured to delay the first channel weights by one channel estimation interval to obtain first delayed channel weights; and a plurality of second delay units configured to delay the second channel weights by one channel estimation interval to obtain second delayed channel weights, wherein the plurality of filter units are configured to filter the received radio signals based on the first and second delayed channel weights.

24. The receiver of claim 23, further comprising:

a plurality of third delay units configured to delay the coefficients of the first auto-correlation matrices by one channel estimation interval to obtain delayed coefficients of the first auto-correlation matrices; and a plurality of fourth delay units configured to delay the coefficients of the second auto-correlation matrices by one channel estimation interval to obtain delayed coefficients of the second auto-correlation matrices, wherein the plurality of filter units are configured to filter the received radio signals based on the delayed coefficients of the first and second auto-correlation matrices.

25. The method of claim 14, wherein generating the at least one weighting factor comprises generating the at least one weighting factor by using the at least one first signal generated by solely corresponding RAKE fingers in the plurality of sets of RAKE fingers.

26. A receiver, comprising:

a plurality of antenna ports each configured to receive radio signals from a plurality of transmission paths;

a plurality of sets of RAKE fingers configured to generate at least one first signal, each set of RAKE fingers coupled to a respective one of the plurality of antenna ports, wherein each of the RAKE fingers of one set of RAKE fingers correspond to a respective RAKE finger of another set of RAKE fingers and to one of the plurality of transmission paths; and a weighting factor generator configured to generate at least one weighting factor based on an auto-correlation matrix of interference plus noise for weighting the at least one first signal, wherein the at least one first signal generated by corresponding RAKE fingers from each set of RAKE fingers in the plurality of sets of RAKE fingers are used to calculate the auto-correlation matrix of interference plus noise.

27. A method, comprising:

receiving radio signals from a plurality of transmission paths through a plurality of antenna ports;

establishing a plurality of sets of RAKE fingers, each set of RAKE fingers coupled to a respective one of the plurality of antenna ports, and wherein each of the RAKE fingers of one set of RAKE fingers correspond to a respective RAKE finger of another set of RAKE fingers and to one of the plurality of transmission paths;

generating at least one first signal using the plurality of sets of RAKE fingers;

estimating or calculating an auto-correlation matrix for interference plus noise for corresponding RAKE fingers in the plurality of sets of RAKE fingers; and generating at least one weighting factor for weighting the at least one first signal, wherein the at least one weighting factor is generated by using the at least one first signal generated by corresponding RAKE fingers in the plurality of sets of RAKE fingers and using the auto-correlation matrix of interference plus noise.

28. The receiver of claim 26, wherein the weighting factor for one of the first signals depends on all first signals of one specific transmission path of the received radio signal.

29. The receiver of claim 26, further comprising:

a first unit configured to weight the first signals with the weighting factors and to combine the weighted first signals to form second signals.

30. The receiver of claim 29, wherein first unit combines the weighted first signals assigned to the same transmission path of the received radio signals to the second signals.

31. The receiver of claim 26, wherein the received radio signals comprise symbols transmitted over a pilot channel and a dedicated channel.

32. The method of claim 27, wherein the weighting factor for one of the first signals depends on all first signals of one specific transmission path of the received radio signal.

33. The method of claim 27, further comprising;

weighting the first signals with the weighting factors; and combining the weighted first signals to form second signals.

34. The method of claim 33, wherein the weighted first signals assigned to the same transmission path of the received radio signals are combined to form the second signals.

35. The method of claim 27, wherein the received radio signals comprise symbols transmitted over a pilot channel and a dedicated channel.

36. The method of claim 35, further comprising:

generating coefficients of the cross-correlation vector by a channel estimation based on symbols of the dedicated channel.

37. The method of claim 35, further comprising:

generating coefficients of the cross-correlation vector by a channel estimation based on symbols of the pilot channel.

* * * * *